June 2, 1931.  M. M. BULL  1,808,016
TONGS
Filed May 22, 1930
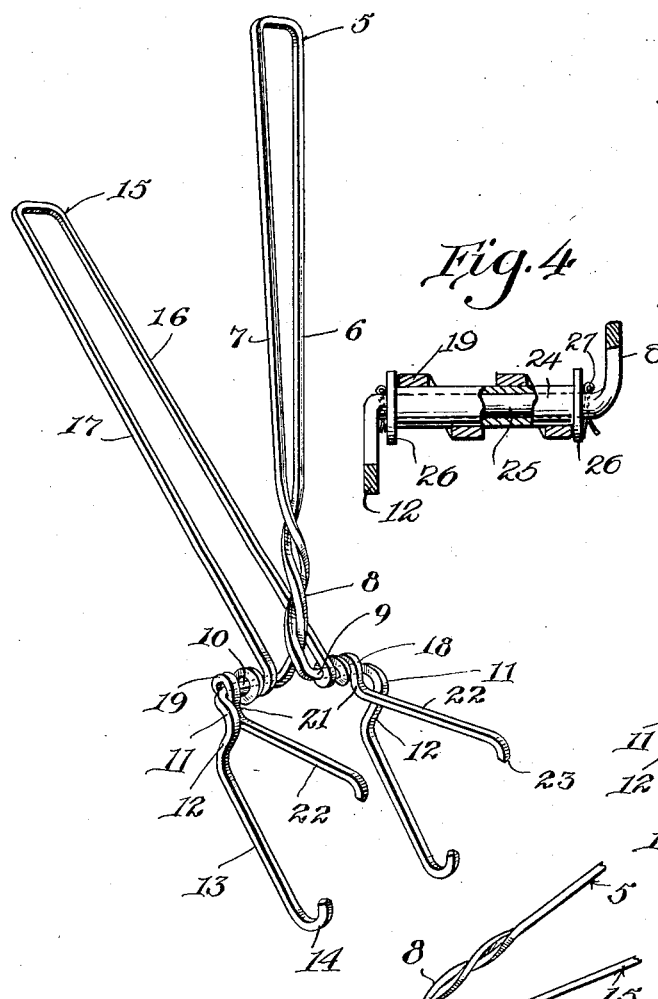
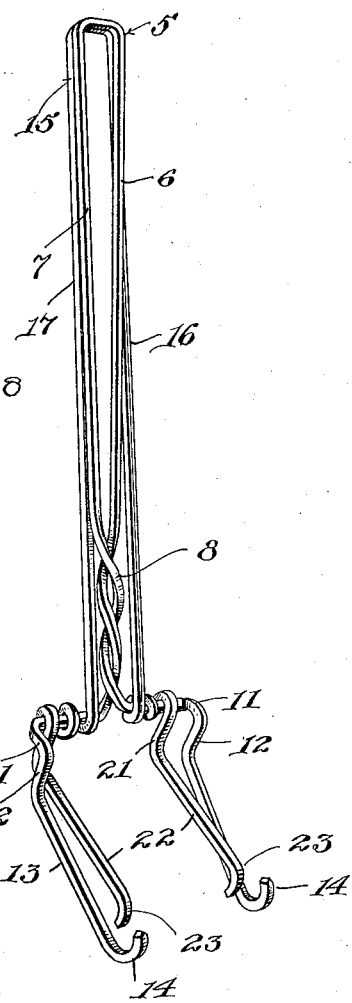
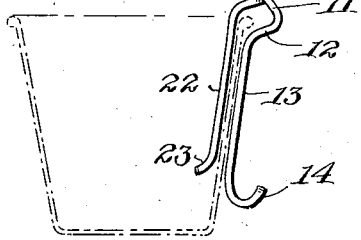
Inventor
Milton M. Bull
By Henry T. Bright
Attorney Patented June 2, 1931

1,808,016

UNITED STATES PATENT OFFICE

MILTON M. BULL, OF EUGENE, OREGON

TONGS

Application filed May 22, 1930. Serial No. 454,717.

My invention relates to improvements in tongs.

An important object of my invention is to provide tongs capable of use for various purposes and to this end to provide a construction whereby the jaws of the tongs can be reversed to make either confronting hook elements or confronting surfaces available in grasping various objects.

Another object of the invention is to construct the tongs of two members fashioned or bent to provide all of the elements of the tongs and to afford a pivotal union between the members.

With these and other objects in view, my invention consists in the construction and novel combination of parts hereinafter more fully described and illustrated.

Figure 1 is a perspective view of the tongs in one open position whereby the hook members are available for gripping an object.

Figure 2, a perspective view of the tongs in closed position;

Figure 3, a side view of the tongs in reverse position gripping a pail; and

Figure 4, a view showing a modification in the connection between the tongs.

Referring to the drawings the numeral 5 designates the handle of one member formed by bending a strip of metal so that arms 6 and 7 converge toward and are twisted around each other at 8. The arms 6 and 7 are then bent laterally outward as at 9 and 10 to provide lateral shoulders on which the other member can be pivotally mounted. The gripping jaw of this member is now formed by bending each arm forwardly as at 11, then downwardly as at 12 and then forwardly to provide the parallel arms 13 at the end of which hooks 14 are provided by bending the material upwardly opposite to the portions 12.

The other member of the tongs has a handle 15 formed by bending a strip of metal to provide parallel arms 16 and 17 which are spaced substantially the same width as the upper portions of the arms 6 and 7, so that the two handle portions will contact at their upper ends when the tongs are completely closed. The arms 16 and 17 are each bent or wrapped completely around the lateral portions 9 and 10 to form one or more coils 18 and 19 which are rotatable on the portions 9 and 10 when the handle portions 5 and 15 are moved to and from each other. After the coils 18 and 19 are formed the two ends of the strip are bent downwardly as at 21 between the portions 12 and substantially parallel thereto when the tongs are closed as shown in Fig. 2, and then the same are brought forwardly to form parallel arms 22 at the end of which hooks 23 are provided by bending the material downwardly in a plane substantially parallel to the portions 21.

The foregoing description of the arrangement of the parts is given on the basis of the position of same as shown in Figures 1 and 2, from which it will be apparent that the complete tongs comprise the two handle portions 5 and 15 adapted to contact at their upper ends. The twisted portion 8 of the handle part 5 will lie between the arms of the handle part 15 and provides against frictional binding between the handles in moving the two members with respect to each other in opening and closing the tongs.

In operation and assuming that the tongs are in the position shown in Fig. 2 and it is desired to pick up a log or other round or bulky object, the handles are pulled apart until the confronting hooks 14 and 23 are far enough apart to be slipped over the object so that the inner confronting surfaces of the arms 13 and 22 can be advanced towards parallelism with each other to grip the object, the hooks serving to keep the object from slipping out. In the same manner the hooks per se can be utilized to grasp soft or slippery objects.

To reverse the tongs the handles would be swung apart from the positions shown in Figures 2 and 1 almost completely around the axes 9 and 10, so that the jaw members 13 and 22 and hooks 14 and 23 would pass each other. When the hooks 23 and 13 are pointing outwardly from each other as in Figure 3 instead of confronting each other as in Figure 1, the tongs are in reverse position and the smooth or back portions of the arms 15 and 22 are then in position to be advanced toward parallelism by reverse movement of the handles to grip flat surfaces such as the side of a container or bucket as shown in dotted lines in Figure 3.

It will be noted that the jaw members are so formed that the portions 12, 13 and hooks 14 in cooperation with the portions 21, 22 and hooks 23 constitute a cradle within which bulky objects can be disposed, while the same parts, except the hooks, are so disposed as to present flat gripping surfaces on the backs of the arms 13 and 22 when reversed.

Figure 4 shows a sleeve 24 mounted on the lateral shoulder 10. Washers 26 are mounted on the shoulder 10 at each end of the sleeve 24 and are held in position and against sliding movement on the shoulder 10 by cotter pins 27 extending through the shoulders.

It will be noted that the washers 26 are of a diameter to project beyond the outer surface of the sleeve 24 to prevent the coils 19 from sliding longitudinally of the sleeve 24 which latter constitutes a smooth bearing for the coils 19 to assure free movement and prevent binding of the tongs. It will be apparent that the sleeves 24 can be formed with integral annular flanges corresponding to and serving the purpose of the washers 27. It is understood that the arrangement shown and described in connection with Figure 4 applies to both of the lateral shoulders.

It will be understood of course that the tongs can be made of various metals, that the number of coils forming the union between the parts can be varied, that the length and dimensions and spacing of the various elements can be varied to meet varying requirements.

I claim:

1. Reversible tongs comprising cooperating members each formed from a strip of material fashioned to present handle and jaw portions and pivotally connected together by bending portions of one around parts of another, said jaw portions being formed to present a cradle like gripping surface with inwardly directed hook members in one position and oppositely disposed flat gripping surfaces in reversed position.

2. Reversible tongs comprising two members, one being bent upon itself to provide a handle portion with converging arms twisted about each other and laterally extended from such twist to provide shoulders, the other being bent upon itself to provide another handle portion with substantially parallel arms between which a part of said other handle portion lies and against which a part of said other handle portion abuts, said second member being bent around said shoulders to pivotally connect the two, jaw portions on said members, said jaw portions being formed to present a cradle like gripping surface with inwardly directed hooks in one position and oppositely disposed flat gripping surfaces in reverse position.

3. Tongs having cooperating members each formed to provide handle and jaw portions, lateral shoulders on one member between handle and jaw portions, sleeves on said lateral shoulders forming a bearing on which to pivotally mount the other member, and means adjacent the ends of said sleeve members to maintain said second member on the sleeves and to prevent displacement therefrom.

In testimony whereof I hereunto affix my signature.

MILTON M. BULL.